Aug. 13, 1935.   G. M. CARTER   2,010,975
WHEELBARROW
Filed Dec. 14, 1931
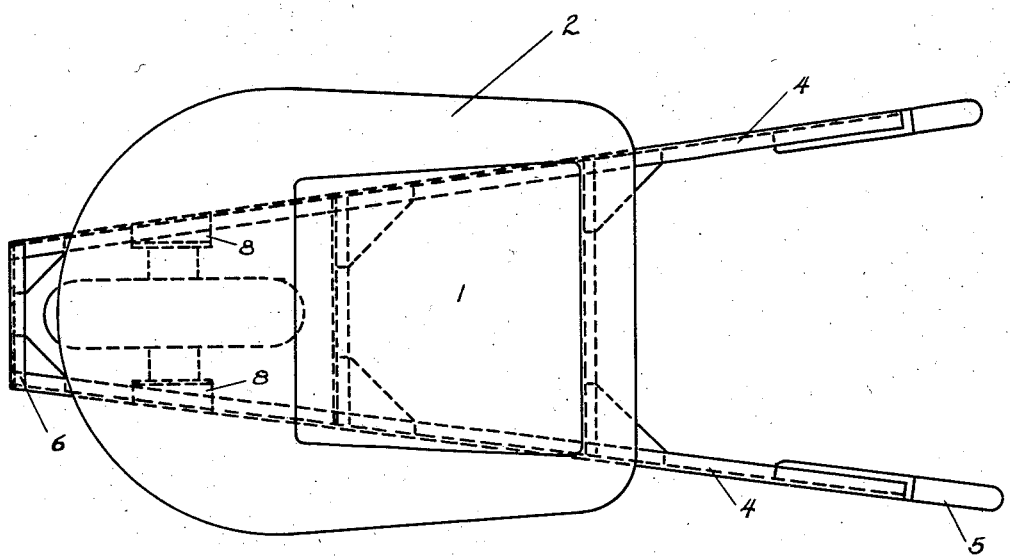
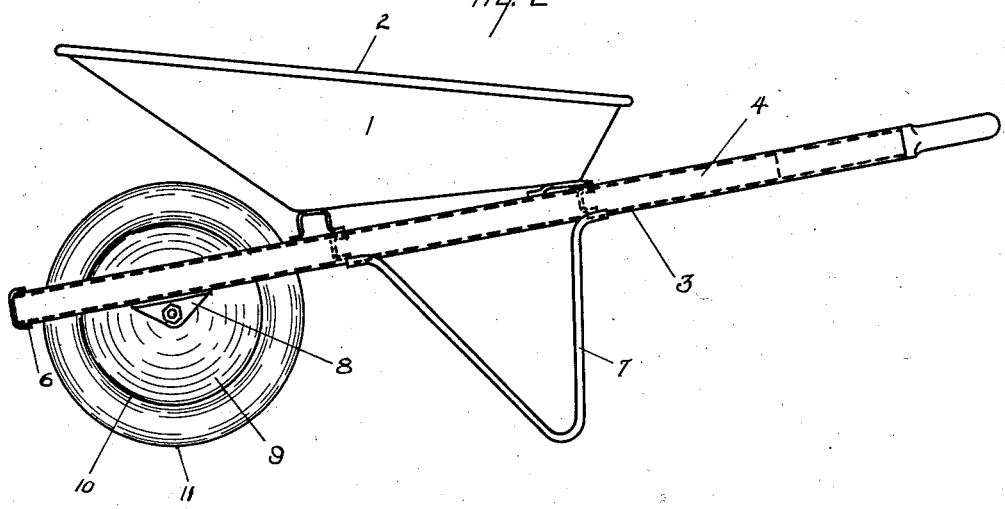
INVENTOR.
George M. Carter
BY
Townsend J. Beaman
ATTORNEY Patented Aug. 13, 1935

2,010,975

UNITED STATES PATENT OFFICE 2,010,975

WHEELBARROW

George M. Carter, Jackson, Mich.

Application December 14, 1931, Serial No. 580,792

1 Claim. (Cl. 280—52)

This invention in its broadest aspect relates to transportation machinery and has particular reference to wheelbarrows.

One of the objects of this invention is to provide a wheelbarrow with greatly increased pay load capacity.

Another object of this invention is to provide a wheelbarrow of substantially one third the weight of the commonly employed steel structure type.

A further object of this invention is to provide a light weight wheelbarrow with a low pressure pneumatic tired wheel which greatly increases the life of the wheelbarrow by relieving the structure from fatigue due to shock.

A still further object of this invention is to provide a wheelbarrow of increased pay load capacity, hourly load capacity and of longer life, which is capable of being manually traversed over obstacles and soft foundation without the necessity of constructed runways of planking and the like.

With these and other objects which will appear as the description proceeds, this invention resides in the combination and arrangement of parts hereinafter described and set forth in the claim.

In the accompanying drawing wherein a convenient embodiment of my invention is set forth.

Fig. 1 is a top view of my improved wheelbarrow. The specific structure being more or less diagrammatically shown.

Fig. 2 is a side elevation of my invention.

In the drawing, reference character 1 generally designates a wheelbarrow embodying my improved features consisting of a material holding receptacle 2 supported upon the frame-work generally designated 3 consisting of channels 4 provided with handle 5 at one end and connected together at the other end by means of a U-shaped structure member 6 and a supporting leg structure 7 secured to the frame-work formed by the members 4 and 6 in any well known manner.

Positioned in the frame-work 3 on longitudinally adjustable bearing portions containing journal mountings, preferably of the anti-friction type such as ball or tapered roller bearings, is a wheel 9 provided with a rim 10 having mounted thereon a pneumatic tire 11, preferably of the low-pressure or balloon type.

The material holding receptacle 2 and the frame-work generally designated 3 is preferably constructed of some strong aluminum alloy, but this invention is not limited to any particular material but resides in the discovery that, by reducing to a minimum the shock to which a wheelbarrow is subjected during normal use by substituting a low pressure pneumatic tire for the usual steel band rim, the cubic volume of metal required to withstand the same amount of wear may be materially reduced from one third to one half and when strong aluminum alloy is employed, it is possible to reduce the weight of the wheelbarrow from one half to two thirds of that of a similarly constructed steel wheelbarrow capable of withstanding a similar amount of wear. This unexpected result is predicated upon the theory that failure of material and rapid wear in the solid wheel type of wheelbarrow is due, in a substantial part, to the crystallization of the metal from severe shock resulting from the irregular surface on which a wheelbarrow is usually traversed and the usual unyielding character of its load. Furthermore as the weight is greatly reduced, as when strong aluminum alloy is employed, the momentum of the wheelbarrow is reduced proportionally to the decrease in mass and the rough usuage given instruments of this type does not have such a detrimental effect upon the structure.

Aside from the weight reducing advantage resulting from the use of aluminum alloy, there is also revealed another characteristic of such alloy which is of decided importance in wheelbarrow structure, namely, the ability to absorb sharp stresses without fracture of material. The yield point of strong aluminum alloy and ordinary structural steel is substantially the same, yet the modulus of elasticity is one-third that of steel. For this reason, the stress of sharp repeated blows to which a wheelbarrow is subjected to during ordinary use is distributed over a greater distance of flexure and the maximum strain is thus proportionally reduced.

As a wheelbarrow is manually operated, any feature which increases the ease of operation and reduces fatigue of the operator is desirable. Actual test shows that a wheelbarrow equipped with a shock absorbing wheel greatly increases the hourly load capacity per operator by removing the fatiguing vibration of the load transmitted to the shoulder of the operator by the solid wheel type and substituting therefor a uniform strain.

Another decided advantage resulting from the use of a low pressure pneumatic tire aside from the shock reduced effect upon structure, load and operator, is that it is possible to eliminate the necessity of providing runways of planking or the like in order to traverse the wheelbarrow over rough or soft foundation as the low pressure tire yields to the obstruction and provides a wire surface over which to distribute the gross weight of the wheel barrow and load.

It is obvious that this invention is not limited to single wheeled manually operated instrument, but has equal adaptation in two, three and four wheel dump and push carts subjected to the same conditions during use. Furthermore it is obvious that other highly resilient surfaced wheels may be substituted for the low pressure pneumatic one, such as rubber casings with sponge rubber liners and the like.

Having thus described my invention it will be seen that changes and modifications may be made therein by those skilled in the art without departing from the spirit and scope of the invention and I do not wish to be limited to the details herein disclosed, but what I claim as new and desire to secure by Letters Patent is:

A wheelbarrow comprising, a material holding receptacle, a supporting frame for said receptacle provided with wheel mounts adjacent one end and handles at the other end, a wheel in said wheel mounts, said receptacle being disposed upon the frame structure between the wheel mounts and the handles and both the receptacle and frame structure being made of aluminum material of sectional strength relatively less than is ordinarily considered a safe factor for the load and shocks usually encountered by a wheelbarrow when in use, and a cushion tire on said wheel to absorb shocks and consequently reduce vibrations set up in the load carried by the receptacle to a safe working point for the frame structure and receptacle, said receptacle and frame structure being thus made relatively lighter in weight to decrease the load imposed upon the operator and the reduction in vibrations accomplished through the use of the cushion tire serving to at the same time reduce shocks otherwise ordinarily transmitted through the handle portions to the operator.

GEORGE M. CARTER.